United States Patent Office 3,826,842
Patented July 30, 1974

3,826,842
INSECT REPELLENT COMPOSITIONS AND PROCESS HAVING AN N-SUBSTITUTED HYDROXYALKYL AMINE AS AN ACTIVE INGREDIENT
Carl Bordenca, Pointe Vedra Beach, and Robert P. Johnson and Kenneth P. Dorschner, Jacksonville, Fla., assignors to SCM Corporation, Cleveland, Ohio
No Drawing. Continuation-in-part of abandoned application Ser. No. 189,464, Oct. 14, 1971. This application June 23, 1972, Ser. No. 265,724
Int. Cl. A01n 9/20
U.S. Cl. 424—325                 5 Claims

ABSTRACT OF THE DISCLOSURE

Monoalkanolamines having a $C_{3-6}$ alkanol residue with terminal hydroxylation and having at least one of the amino hydrogens replaced by a $C_{8-10}$ n-alkyl radical are effective insect repellents and even can repel biting flies from the skin of animals.

---

This patent application is a continuation-in-part of U.S. patent application Ser. No. 189,464, filed on Oct. 14, 1971, and now abandoned.

This invention relates to insect repellent compositions and process, and more particularly to such compositions and process wherein the active ingredient comprises certain repellent alkanolamines.

The closest art known to applicants is their concurrently submitted U.S. patent application Ser. No. 265,673 a continuation-in-part of Ser. No. 189,464 filed on Oct. 14, 1971, and said Ser. No. 189,464. Significantly secondary alkanol analogues of some of the instant active alkanolamines have been shown very broadly as insecticides (U.S. 2,541,089). Ethanol homologues of some of the instant active alkanolamines have been taught as insecticides in suitable carrier emulsions and dusts. Preparations of the instant active alkanolamine follow the teachings of U.S. patents 2,689,263; 2,421,129; 2,363,081; 2,363,082; and 2,363,083. Linduska et al. *J. Econ. Entomol. 39*, 767–9 (1946), shows that the analogue (2-hydroxyethyl) dodecylamine and 73 other assorted compounds show flea-repellent activity.

The instant invention is based on our discovery that monoalkanolamines having a $C_{3-6}$ alkanol residue with terminal hydroxylation and having at least one of the amino hydrogens replaced by a $C_{8-10}$ normal alkyl radical are effective insect repellents and can even repel biting flies from the skin of animals including humans.

In one aspect our invention is an insect repellent composition containing about 0.01 to 90 percent by weight of such alkanolamine and an inert carrier suitable for medicinal, cosmetic, or agricultural use. Another aspect is a process for repelling insects from a substrate such as live animal skin by applying a minute but repellent amount of such alkanolamine thereon. Application dosages suitably are from 5 to 500 mg. per square foot of the substrate exposed to insects, and can vary somewhat from this depending upon the degree of repellency desired, insect to be repelled, climate and expected exposure. The repellent effect is surprisingly long-lasting. A further aspect is a process for repelling insects from a substrate which comprises applying to said substrate an insect repelling proportion of the instant active alkanolamines. Application dosages are suitably from about 5 to 500 mg. per square foot of substrate exposed to insects and can vary somewhat from this depending on the degree of repellency desired, the climate and the expected exposure.

In linear formula the instant active alkanolamines can be represented thus:

$R_1R_2R_3N$ wherein $R_1$ is a $C_{3-6}$ terminally hydroxylated alkyl radical
$R_2$ is a $C_{8-10}$ normal alkyl radical and
$R_3$ is a $C_{8-10}$ normal alkyl radical or the hydrogen atom.

Advantageous alkanolamines for our purposes include normal alkylated 2-hydroxyl-1,1-dimethylethylamines and 3-hydroxypropylamines for efficiency and economy.

In the foregoing formula $R_1$ can represent various lower hydroxyalkyl radicals (i.e., alkanol residues) containing between 3 and 6 carbon atoms and include those radicals derived by removing a hydrogen atom from an unhydroxylated carbon atom from n-propanol, n-butanol, 2-methyl-propanol-1, pentanol and its isomeric primary alcohols, and hexanol and its isomeric primary alcohols. The 2-methyl-propanol-1 group sometimes is referred to as 1-hydroxy-2-methyl-2-propyl radical; its connection to the amino nitrogen in the compounds concerned herein can be illustrated by way of example as follows:

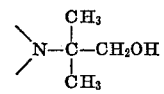

This particular hydroxy alkanol moiety depicted is preferably named as the 2-hydroxy-1,1-dimethylethyl radical in accord with Chemical Abstracts nomenclature when such amino alcohols are named with the amine as the principal component.

Data shown in the examples demonstrate that the lower hydroxyalkyl radical in the series n-octayl, n-nonyl and n-decyl amino lower alkanols must contain at least three carbon atoms to be significantly effective insect repellents. Compounds in which $R_1$ is the 2-hydroxy-1,1-dimethylethyl radical have been found particularly advantageous for insect repellency.

Particularly effective for our invention are the compounds N-(2-hydroxy 1,1-dimethylethyl) n-octylamine or $\underline{N}$-(2-hydroxy, 1,1-dimethyl) di(n-octyl)amine and their n-decyl counterparts.

Specific compounds which are secondary amines where $R_2$ is a $C_{8-10}$ alkyl hydrocarbyl radical and $R_3$ is H, and which are useful in the practice of this invention include the following specific compounds and their n-nonyl and n-decyl counterparts:

N-(3-hydroxypropyl) n-octylamine
$\underline{N}$-(2-hydroxy-1-methylethyl) n-octylamine
$\underline{N}$-(2-hydroxy-1,1-dimethylethyl) n-octylamine Specific compounds which are tertiary amines wherein $R_2$ and $R_3$ are n-octyl and which are useful in the practice of this invention include the following and their n-nonyl and n-decyl counterparts:

$\underline{N}$-(2-hydroxy-1,1-dimethylethyl) di(n-octyl)amine
$\underline{N}$-(1-hydroxymethyl-propyl) di(n-octyl)amine
$\underline{N}$-(3-hydroxypropyl) n-di(n-octyl)amine

SYNTHESIS

The compounds of this invention may be prepared by modification of methods well known in the literature. Common general methods for the preparation of substituted aminoalkanols are shown in U.S. 2,363,081 as intermedaites for the preparation of various local anesthetic esters and in the Journal of the American Chemical Society publications by Ringk et al. (*65*, p. 1222, 1943), Cope et al. (*66*, pp. 1733–1747, 1944), Pierce et al. (*71*, p.

1765, 1949) among others listed in the prior art references.

Other synthetic approaches occasionally used are preparation of the corresponding amino ketone followed by reduction of the keto group to yield the desired alcohol and hydrogenation of the corresponding oxazolidines as described by Cope and Hancock (J. Am. Chem. Soc. 66, page 1453, 1944).

A preferred synthetic method for the preparation of the compounds of this invention comprises heating the corresponding hydrocarbyl halide with the hydroxy lower alkylamines such as, for example, 2-hydroxy-1,1-dimethylethylamine and 3-hydroxy-propylamine at a temperature in the range from 40° C. to 160° C. in the presence of an acid acceptor.

If desired, an excess of the lower hydroxyalkyl amine can be used as the acid acceptor. The reaction is preferably carried out in an organic solvent inert under the conditions of the reaction. For example, methanol, ethanol, propanol and higher alcohol and ethers may be used but hydrocarbons such as benzene, xylene and the like are generally preferred. The acid acceptor generally is a basic substance which forms water-soluble by-products with the evolved hydrogen halide which are easily separable from the main reaction product. Alternatives to using an excess of the amine as the hydrogen halide acceptor include the use of tertiary amines such as triethylamine or pyridine. Frequently when a hydrocarbon solvent is used the by-product amine hydrochloride will be an insoluble solid which can be easily removed from the reaction product by filtration. Work-up in this case is conveniently carried out by filtering the amine hydrochloride, washing the remaining organic phase with water, evaporating the solvent and distilling the product. In some cases where the products are solids, recrystallization is preferred to distillation.

The foregoing compounds range from high-boiling liquids to low-melting solids and have limited water solubility. They can be made water soluble by reacting them with a suitable acid such as, for example, hydrochloric, sulfuric, or phosphoric acid, to convert the compounds into the corresponding amine acid salt. Under such circumstances the carrier can be water. It is contemplated that both the hydroxyalkylamine and their water-soluble salts will both be useful in the practice of this invention.

The term "applying to a substrate" should be understood as any method or process by which the said repellent is brought into contact with the said substrate either penetratingly or superficially. Such surfaces include, for example, growing plants, manufactured products, clothing, webs, and similar devices which might be used in an insect environment. Implied herein are the typical applications, techniques and formulations commonly employed by those skilled in the use and formulation of insect repellents and pesticides including areas of medicine and veterinary applications to animals and the like and to the locus and surroundings where pesticidal protection is desired. Further, by definition, the term includes the designations contact, deposit, soak, place, permeate, impregnate, invest, coat, treat, surround, cover, and like terms. Such deposits would include sprays, lotions, powders, coatings, paints, varnishes, lacquers, and would also imply the finished substrate whether or not other prior or subsequent treatments are commonly made thereto.

Typical repellent compositions will contain advantageously between about 0.1 and about 50 and in some instances 0.1–25 weight percent of one or more of the compounds herein defined, the carrier often being fugitive on exposure or dilutable with innocuous diluents such as water.

A wide spectrum of insects such as, for example, ticks, flour beetles, moths, houseflies, stable and other biting flies such as horn flies, horse flies and deer flies, chiggers, ants, cockroaches, mosquitoes, and the like can be repelled effectively for prolonged periods of time, e.g., up to a month or even longer in some cases.

The carrier employed can be any carrier conventionally used in insect-repellent formulations with the proviso that the carrier should be inert; that is, it should be incapable of undergoing a chemical reaction with the compound employed. The carrier should also be one that will not be harmful to the environment in which it is employed. Hence intermediates, unreacted excess reactants or reagents, by-products of reaction and solvents containing such generally extraneous chemical material definitely are not a part of the inventive compositions, the latter being fairly commercially pure compounds, e.g., 85 percent or above with only innocuous diluents, admixed with acceptable carriers for the use. Thus, some agricultural applications can tolerate the common commercially pure admixtures, while applications to animal or human skin demand quite high purities of admixture.

When it is desired to render packaging material such as, for example, boxes, repellent to cockroaches or beetles the insect-repellent compounds or compositions should be used in sufficient amount to leave an effective layer or residue on the surface of the packaging material. The effective amount of compound to be deposited on the substrate to be made repellent will depend to some extent on the character of carrier used and on the substrate to be protected.

If the repellent is to be applied to a domestic animal such as, for example, a dog to repel biting flies (which often are unaffected by conventional repellents) the carrier should be non-toxic to such animals. Especially preferred are those bland carriers commonly accepted as suitable for veterinary, cosmetic and medicinal preparations.

Admixtures with non-toxic and non-irritating alcohols, such as isopropanol, hexanols, and other commonly used adjuvants are preferred. Some of the useful adjuvants may themselves possess some measure of repellent activity and such combinations may exhibit synergistic effects providing repellent activity beyond that expected from individual components. Also contemplated in certain repellent usage are combinations of the subject alkanolamines with which are mixed useful insecticidally active compounds such as, for example, natural or synthetic pyrethrins. It is expected that the novel compounds of this invention will afford more economical use of such synergizable substances.

The carrier can be any one or an appropriate mixture of a variety of organic or inorganic liquid, solid, or semi-solid carriers or carrier formulations conventionally used in the insect repellent art.

Examples of liquid hydrocarbon carriers which are widely used for economic reasons as agricultural carriers include oils produced by the distillation of coal and the distillation of various types and grades of petrochemical stocks. Petroleum oils which are especially useful and economical include kerosene oils, light and medium agricultural spray oils and heavy paraffin oils for use in emulsions. Generally preferred are highly refined oils which contain only minute amounts of unsaturated materials as measured by standard sulfonation tests. Such paraffin oils can be emulsified with water and an emulsifier and diluted to lower concentrations and used in conventional aerosol spray devices. Tall oils obtained from the sulfate digestion of wood pulp, like paraffin oils, can also be employed.

In addition to the above-mentioned liquid hydrocarbons, and often employed in conjunction therewith, a carrier can contain conventional emulsifying agents; for example, a nonionic surfactant such as the ethylene oxide condensate of octylphenol or an anionic surfactant such as, for example, an alkali metal salt of an alkylbenzenesulfonic acid. Such emulsifiers permit the composition to be dispersed in and diluted with water for end-use applications.

Paraffin oils are generally employed as carriers in the insect-repellent compositions of this invention, in conjunction with an emulsifier, the mixture being diluted with water immediately prior to end-use application. By way of example, when a compound falling within the scope of the formula hereinbefore described is dissolved in paraffin oil containing an emulsifier and such composition is subsequently diluted with water to form an oil-in-water emulsion, the emulsion, when atomized and sprayed in insect-infested areas or in areas which are likely to become insect infested, is a highly effective repellent against such insects and will retain its repellent activity for prolonged periods of time.

Other advantageous organic liquid carriers can include liquid terpene hydrocarbons and terpene alcohols; for example, α-pinene, dipentene, terpineol, and the like. Still other liquid carriers can include organic solvents such as volatile aliphatic and aromatic alcohols, esters, aldehydes and ketones. Aliphatic monohydric alcohols which can be employed include methyl, ethyl, n-propyl, isopropyl, n-butyl, sec-butyl, and t-butyl alcohols. Suitable polyhydric alcohols such as ethylene glycol, propylene glycol, glycerine and the pinacols may be employed.

It is anticipated that creams and lotions containing the subject hydroxyalkylamines of this invention will be preferred applications for human protection against certain insects including mosquitoes. These preparations which will generally contain other adjuvants commonly used in the art can be applied directly to the skin or exposed body portions in humans or animals or, alternatively, be applied to articles of clothing.

The above-described repellents can be formulated in creams and lotions using, by way of example, 0.5 to about 10 parts of the said hydroxyalkylamine in conjunction with about 7 parts dimethyl phthalate and about 3.5 parts magnesium stearate.

Solid carriers which can be used in the compositions include finely divided inorganic solid materials, examples of such materials include finely divided siliceous minerals such as clays, e.g., bentonite, attapulgite, fullers earth, diatomaceous earth, kaolin, mica, talc, finely divided quartz, etc., as well as synthetically prepared siliceous materials including silica aerogels and precipitates and fume silicas.

Examples of semisolid carriers include petroleum jelly, lanolin, and the like and mixtures of liquid and solid carriers which provide semisolid end products.

The above-described compositions can be employed without further dilution, or can be diluted with suitable liquids or solids to repel common insect pests such as roaches, termites, beetles, flies, including biting flies, mosquitoes, weevils, moths, ticks, chinch bugs, lice, mites and the like. Such compositions, when used to contact an insect environment, can effectively repel the insects. By way of example, one advantageous embodiment of a composition of this invention for application to the skin comprises from about 0.1 to 50 percent, preferably 1 to about 25 percent, by weight, of a hydroxyalkylamine compound of this invention. Other formulations include up to 10 parts of the lower hydroxyalkylamine, 25 parts dimethyl phthalate, 20 parts white wax, and 50 parts peanut oil.

Granaries and silos can be treated with the compositions of this invention prior to grain storage to discourage beetle, weevil, and other insect infestation in the grain to be subsequently stored.

The following examples are intended to illustrate the invention but not to limit the scope thereof, parts and percentages being by weight unless otherwise indicated. As we have found that the tertiary amino counterparts of the secondary amines below exemplified are not quite as active insect repellents as such secondary amines, only the latter are exemplified specially.

EXAMPLE 1

N-(2-hydroxy-1,1-dimethylethyl) n-octylamine

A mixture of 72.2 grams (0.48 mole) of 1-chlorooctane, 86.6 grams (0.97 mole) of 2-amino-2-methyl-1-propanol and 8.3 grams of potassium iodide was stirred and heated in 250 milliliters of xylene for 27 hours at 140° C. The reaction product was cooled to room temperature and filtered. The xylene filtrate was washed with 5 percent aqueous sodium hydroxide solution and finally with water and dried over anhydrous magnesium sulfate. After removing the xylene by distillation under reduced pressure the residue was distilled through a short Vigreaux column. The fraction boiling at 94–96° C./0.06 mm. Hg absolute solidified on cooling to a solid melting at 54–57° C., and represented a 75 percent yield of the desired prouct. Purity was estimated at 99 percent by gas-liquid chromotography and NMR spectroscopy.

EXAMPLE 2

N-(2-hydroxy-1,1-dimethylethyl) di(n-octyl)amine was isolated as a higher boiling fraction in the vacuum distillation (B.P. 135° C. at 0.05 mm. Hg absolute) described in Example 1 after the removal of the compound of Example 1. The purity was estimated to be 98 percent.

EXAMPLE 3

N-(2-hydroxy-1,1-dimethylethyl) n-nonyl amine was prepared in 58 percent yield according to the procedure of Example 1 except that 1-chlorononane was used in place of 1-chlorooctane. The compound had a melting point of 53–54° C. and purity was estimated at 99 percent.

EXAMPLE 4

N-(2-hydroxy-1,1-dimethylethyl) n-decylamine was prepared in a manner similar to the procedure given in Example 1 except that 1-chlorodecane was used in place of 1-chlorooctane.

EXAMPLE 5

N-(3-hydroxypropyl) n-octylamine was synthesized in 78 percent yield according to the procedure described in Example 1 except that 3-aminopropanol was used in place of 2-amino-2-methyl-1-propanol. The desired product was purified by vacuum distillation (b.p. 100° C. at 0.05 mm. Hg. absolute). Infrared and NMR spectroscopy established the purity to be above 98 percent.

EXAMPLE 6

3.0 grams of N-(2-hydroxy-1,1-dimethylethyl)n-octylamine dissolved in 100 ml. acetone was applied to one-square-foot sections of 50 lb. weight brown kraft paper in a manner to deposit 104 mg. of active amine per square foot. Immediately after the treated papers become dry seven-inch diameter circular sections are cut from the center of each treated sheet and folded to form conical houses. A small opening is cut into the bottom or large end of each cone.

A treated and an untreated cone are then placed into a large glass evaporating dish and exposed to a mixed population of roaches. Repellency is determined daily by counting the roaches that rest on the treated paper surfaces. All tests were replicated at least two times. Dead roaches were replaced as needed to continue exposure. Effectiveness of the compound to repel *Blattella germanica* is shown in Table I. It is seen that N-(2-hydroxy-1,1-dimethylethyl) n-octylamine provides protection for more than 17 days while the Standards begin to fail 9 days after treatment.

Effectiveness in repelling American cockroaches is compared in Table II with a standard insect repellent. It is seen that the repellency imparted to kraft paper by N-(2-hydroxy-1,1-dimethylethyl) n-octylamine lasts for at least 13 days and compares favorably with the standard.

TABLE I

Insect repellency to *Blattella germanica**

| Chemical treatment | Percent roaches inside and on treated paper on days after treatment | | | | | |
|---|---|---|---|---|---|---|
| | 1 | 5 | 9 | 10 | 13 | 17 |
| N-(2-hydroxy-1,1-dimethylethyl) n-octylamine | 0 | 0 | 0 | 0 | 2 | 0 |
| 2-hydroxyethyl-n-octylsulfide—Standard | 8 | 0 | 4 | 10 | 22 | |
| N,N-diethyl-m-toluamide—Standard | 4 | 0 | 14 | 10 | 14 | |
| None | 36 | 30 | 28 | 56 | 60 | 72 |

*Average of two replicates.

TABLE II

Insect repellency to American cockroaches*

| Chemical treatment | Percent roaches inside and on treated paper on days after treatment | | |
|---|---|---|---|
| | 4 | 10 | 13 |
| N-(2-hydroxy-1,1-dimethyl) n-octylamine | 0 | 0 | 0 |
| 2-hydroxyethyl-n-octylsulfide—Standard | 0 | 0 | 0 |
| None | 0 | 30 | 30 |

*Average of three replicates.

EXAMPLE 7

One milliliter samples of 10 and 20 weight percent N-(2-hydroxy-1,1-dimethylethyl) n-octylamine dissolved in isopropyl alcohol were applied to the forearm of the test subject and compared with a similar application of the Standard *Deet* (N,N-diethyl-m-toluamide) on the other arm. The treated areas were exposed to caged insects for three minutes at thirty-minute intervals. Protection time afforded in hours is shown in Table III. Failure is indicated by receipt of two bites on the same or in succeeding exposure periods. It is seen that the 10 and 20 percent dosage levels of the octylamine provide 2.5 to 4.0 hour protection, respectively, against stable (biting) flies, and the 20 percent dosage gives 3.5 hour protection against mosquities, said treatment rates approximating 200 and 400 mg. per square foot, respectively. These results compare favorably to that obtained by the Standard insect repellent at similar application levels.

Surprisingly, however, when a similar test on animals was run to check repellency towards biting flies, e.g., stable flies, horn flies, horse flies, and deer flies, the standard was practically ineffective, whereas the inventive application performed very effectively.

TABLE III

Personal insect repellent tests*

| Chemical treatment | Dosage, percent w./w. in isopropyl alcohol | Average protection time (hours) | |
|---|---|---|---|
| | | Stable flies | Mosquitoes |
| N-(2-hydroxy-1,1-dimethyl-ethyl) n-octylamine | 10 | 2.5 | |
| | 20 | 4.0 | 3.5 |
| N,N-diethyl-m-toluamide—Standard | 10 | 3.0 | |
| | 20 | 4.0 | 3.5 |

*Average of two replicates.

EXAMPLE 8

The same procedure as described in the Example 6 was used to evaluate compounds as insect repellents against American cockroaches (*Periplaneta americana*) and German cockroaches (*Blattella germanica*). In all cases the chemical was applied in an acetone carrier to deposit 100 milligrams per square foot of 50-pound weight brown kraft paper. Table IV shows the importance of the size of the lower hydroxyalkyl group in the practice of the instant invention. Where the hydroxyalkyl group is simply a hydroxyethyl group the effectiveness of the repellent against both species of roach was fairly low. When the hydroxyalkyl group had higher mol weight, but a secondary hydroxyl, i.e., a 2-hydroxypropyl radical, the effectiveness still was not encouraging. Surprisingly better results were obtained where the 3-hydroxypropyl radical was a part of the alkanolamine, and outstandingly better results were obtained where the 2-hydroxy-1,1-dimethyl-ethyl radical was so incorporated.

TABLE IV

Insect repellency test of n-octyl-$\overset{H}{\underset{|}{N}}$-R$_1$ compounds

| Compound | R$_1$ | Percent repellency after days exposed to— | | | | |
|---|---|---|---|---|---|---|
| | | *Periplaneta americana* | | *Blattella germanica* | | |
| | | 3 | 7 | 1 | 2 | 7 |
| N-(2-hydroxyethyl) n-octylamine (control) | —CH$_2$CH$_2$OH | 50 | 0 | 80 | 50 | 0 |
| N-(2-hydroxypropyl) n-octylamine (control) | —CH$_2$CH(OH)—CH$_3$ | 40 | 0 | 100 | 80 | 30 |
| Compound of— | | | | | | |
| Example 5 | —CH$_2$CH$_2$CH$_2$OH | 100 | 100 | 100 | 90 | 50 |
| Example 1 | —C(CH$_3$)$_2$—CH$_2$OH | 100 | 100 | 100 | 100 | 100 |

TABLE V

Insect repellency testing of—

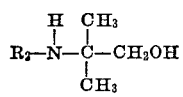

| Compound | R$_2$ | Percent repellency after days exposed to— | | | | |
|---|---|---|---|---|---|---|
| | | *Periplaneta americana* | | *Blattella germanica* | | |
| | | 1 | 7 | 1 | 2 | 7 |
| N-(2-hydroxy-1,1-dimethylethyl) n-hexylamine (control) | n-Hexyl | 10 | 0 | 40 | 10 | 0 |
| N-(2-hydroxy-1,1-dimethylethyl) n-heptylamino (control) | n-Heptyl | 30 | 0 | 50 | 40 | 0 |
| Compound of— | | | | | | |
| Example 1 | n-Octyl | 100 | 100 | 100 | 100 | 100 |
| Example 3 | n-Nonyl | 20 | 0 | 100 | 100 | 100 |
| Example 4 | n-Decyl | 100 | 100 | 100 | 100 | 100 |
| N-(2-hydroxyl-1,1-dimethylethyl) n-(2-ethylhexyl)amine (control) | 2-ethylhexyl | 20 | 0 | 100 | 15 | 0 |

EXAMPLE 9

A series of (2-hydroxy-1,1-dimethylethyl) amines where one of the hydrogens of the amines is replaced by various alkyl groups was tested as insect repellents against the American and German cockroaches as described in the preceding example. As shown in Table V the compounds substituted with n-alkyl groups containing less than 8 carbon atoms exhibit considerably less repellence at 2 and 3 days duration and are completely inactive at 7 days. In contrast, this species substituted with n-alkyl groups such as n-octyl, n-nonyl, and n-decyl are active repellents which give 100% control and remain effective for more than 7 days. It should be noted from Table V that the effectiveness of repellency for the normal straight-chain alkylamines in the $C_8$ to $C_{10}$ range are extremely superior to their branched chain analogues generally both in initial repellence and duration. Curiously, also, the n-octyl and n-decyl materials were good against both kinds of roaches, whereas the n-nonyl was good only against the German roach.

Examples 8 and 9 clearly demonstrate the surprising importance of adequate weight and hydroxyl position on the alkanol residue, and also adequate weight and normal structure of the alkyl substituent on the amino nitrogen; in the $C_{8-10}$ alkyl range the curiously better performance of octyl and decyl over nonyl is noted.

What is claimed is:

1. A process for repelling insects from a substrate where said repellency is desired which comprises applying to said substrate an insect repelling amount of a composition comprising an inert medicinal, agricultural, or cosmetic carrier and an effective amount within the range from about 0.01 to about 90 weight percent of an n-alkylmonoalkanolamine wherein at least one of the amine hydrogens is replaced by a $C_{8-10}$ normal alkyl group and the alkanol group has from 3 to 6 carbon atoms and is terminally hydroxylated, said amount being effective for depositing between about 5 and about 500 mg. of said n-alkylmonoalkanolamine per square foot of said substrate.

2. The process of claim 1 wherein said n-alkylmonoalkanolamine is present as an acid salt of hydrochloric, sulfuric, or phosphoric acid.

3. The process of claim 1 wherein said alkanol group is a 2-hydroxy-1,1-dimethylethyl group.

4. The process of claim 3 wherein said alkyl group is a normal octyl group.

5. The process of claim 1 wherein said substrate is the skin of a live animal, including that of a human.

References Cited

UNITED STATES PATENTS

| | | | |
|---|---|---|---|
| 2,541,089 | 2/1951 | Nikawitz | 260—584 |
| 2,689,263 | 9/1954 | Schmidle et al. | 260—584 |

OTHER REFERENCES

Linduska, J. P., et al., J. Econ. Ent., *39* (1946), pp. 762–269.

VINCENT D. TURNER, Primary Examiner

U.S. Cl. X.R.

424—DIG 10